United States Patent
Lee et al.

(10) Patent No.: US 9,772,516 B2
(45) Date of Patent: Sep. 26, 2017

(54) LIQUID CRYSTAL DISPLAY AND METHOD OF MANUFACTURING THE SAME

(71) Applicant: Samsung Display Co., Ltd., Yongin, Gyeonggi-Do (KR)

(72) Inventors: Hee-Keun Lee, Suwon-si (KR); Suk Hoon Kang, Seoul (KR); Sang Il Kim, Yongin-si (KR); Yeun Tae Kim, Hwaseong-si (KR); Dong Youb Oh, Seoul (KR); Mi Hwa Lee, Seoul (KR); Woo Jae Lee, Yongin-si (KR); Jun Woo Lee, Seongnam-si (KR)

(73) Assignee: Samsung Display Co., ltd. (KR)

( * ) Notice: Subject to any disclaimer, the term of this patent is extended or adjusted under 35 U.S.C. 154(b) by 68 days.

(21) Appl. No.: 14/266,357

(22) Filed: Apr. 30, 2014

(65) Prior Publication Data
US 2015/0092144 A1    Apr. 2, 2015

(30) Foreign Application Priority Data

Sep. 30, 2013 (KR) .................. 10-2013-0116467

(51) Int. Cl.
*G02F 1/1333* (2006.01)
*G02F 1/1337* (2006.01)

(52) U.S. Cl.
CPC ...... *G02F 1/1333* (2013.01); *G02F 1/133377* (2013.01); *G02F 1/133788* (2013.01); *G02F 2001/133368* (2013.01)

(58) Field of Classification Search
CPC ............ G02F 1/1333; G02F 1/133377; G02F 1/133788; G02F 2001/133368
USPC .......................................... 349/123–129, 141
See application file for complete search history.

(56) References Cited

U.S. PATENT DOCUMENTS

| | | | |
|---|---|---|---|
| 6,198,217 B1 | 3/2001 | Suzuki et al. | |
| 6,469,761 B1 | 10/2002 | Drabik et al. | |
| 2006/0280879 A1* | 12/2006 | Park ................. | G02F 1/133788 428/1.1 |
| 2010/0014011 A1* | 1/2010 | Mottram ........... | G02F 1/133377 349/33 |
| 2010/0259713 A1* | 10/2010 | Sato et al. ........ | G02F 1/133345 349/138 |
| 2012/0057111 A1* | 3/2012 | Ohkubo ............. | G02F 1/1339 349/106 |
| 2013/0155360 A1* | 6/2013 | Shibahara ......... | G02F 1/1337 349/123 |

FOREIGN PATENT DOCUMENTS

| | | |
|---|---|---|
| JP | 2008-033117 | 2/2008 |
| JP | 2008-242031 | 10/2008 |
| KR | 10-2007-0001961 A | 1/2007 |

(Continued)

*Primary Examiner* — Charles Chang
(74) *Attorney, Agent, or Firm* — Innovation Counsel LLP

(57) ABSTRACT

A liquid crystal display is provided that includes: a substrate; a thin film transistor disposed on the substrate; a protection layer disposed on the thin film transistor; a first electrode and a second electrode disposed on the protection layer; an alignment layer disposed on the second electrode; and a roof layer facing the second electrode, wherein a plurality of microcavities are formed between the second electrode and the roof layer, the microcavities include a liquid crystal material, and the alignment layer includes a photo-alignment material.

18 Claims, 14 Drawing Sheets

(56) References Cited

FOREIGN PATENT DOCUMENTS

| KR | 10-0688958 B1 | 2/2007 |
| KR | 10-2007-0078389 A | 7/2007 |
| KR | 10-2008-0049193 A | 6/2008 |
| KR | 10-2010-0039805 A | 4/2010 |
| KR | 10-2011-0069401 A | 6/2011 |
| KR | 10-2012-0026880 A | 3/2012 |

* cited by examiner

LIQUID CRYSTAL DISPLAY AND METHOD OF MANUFACTURING THE SAME

CROSS-REFERENCE TO RELATED APPLICATION

This application claims priority to and the benefit of Korean Patent Application No. 10-2013-0116467 filed in the Korean Intellectual Property Office on Sep. 30, 2013, the entire contents of which are incorporated herein by reference.

BACKGROUND (a) Field

The present invention relates to a liquid crystal display and a manufacturing method thereof.

(b) Description of the Related Art

A liquid crystal display is one type of flat panel display device that is widely used. A liquid crystal display includes two display panels on which field generating electrodes such as a pixel electrode and a common electrode are formed, and a liquid crystal layer interposed therebetween.

The liquid crystal display generates an electric field in a liquid crystal layer by applying voltages to the field generating electrodes. The applied electric field determines orientations of liquid crystal molecules of the liquid crystal layer and controls polarization of incident light, thereby displaying an image.

In one technique for making a liquid crystal display that has been developed, instead of forming an upper panel and a separate lower panel, a cavity is formed on one panel as an entire pixel unit, and the liquid crystal is filled into the cavity for realizing the display. In this technique, the display device is manufactured so that a sacrificial layer made of an organic material and a supporting member formed thereon are formed, and then removed, and the liquid crystal is filled to the empty space formed by the removal of the sacrificial layer through a liquid crystal injection hole.

In such a technique, it is essentially impossible to perform a rubbing operation on an inner part of the cavity filled with the liquid crystal such that an alignment layer is rubbed vertically to the substrate.

The above information disclosed in this Background section is only for enhancement of understanding of the background of the disclosure and therefore it may contain information that does not form the prior art that is already known to a person of ordinary skill in the art.

SUMMARY

A liquid crystal display in which an alignment material is horizontally aligned inside a cavity, and a manufacturing method thereof are provided.

A liquid crystal display includes a substrate; a thin film transistor disposed on the substrate; a protection layer disposed on the thin film transistor; a first electrode and a second electrode disposed on the protection layer; an alignment layer disposed on the second electrode; and a roof layer facing the second electrode, wherein a plurality of microcavities are formed between the second electrode and the roof layer, the microcavities including a liquid crystal material, and the alignment layer includes a photo-alignment material.

The photo-alignment material may be a photoisomer type material.

The photo-alignment material includes a cis type photoisomer.

The photo-alignment material may include azo benzene.

The photo-alignment material may be photo-reacted to UV light having a wavelength equal to or less than 365 nanometers.

A lower insulating layer disposed between the microcavities and the roof layer and an upper insulating layer disposed on the roof layer may be further included.

A capping layer disposed on the roof layer may be further included.

A liquid crystal injection hole forming region may be disposed between a plurality of microcavities, and the capping layer may cover the liquid crystal injection hole forming region.

An interlayer insulating layer may be disposed between the first electrode and the second electrode, the first electrode may have a planar shape, and the second electrode may include a plurality of branch electrodes.

A plurality of branch electrodes may overlap the first electrode of the planar shape.

A manufacturing method of a liquid crystal display includes: forming a thin film transistor on a substrate; forming a protection layer on the thin film transistor; forming a first electrode and a second electrode on the protection layer; forming a sacrificial layer on the second electrode; forming a roof layer on the sacrificial layer; removing the sacrificial layer to form a plurality of microcavities including a liquid crystal injection hole; injecting a photo-alignment material in the microcavities; irradiating a polarized light to the photo-alignment material; baking the photo-alignment material; and injecting a liquid crystal material into the microcavities.

The photo-alignment material may include a photoisomer type material.

The photo-alignment material may form a cis type photoisomer upon irradiation of the polarized light.

The photo-alignment material may include azo benzene.

The polarized light may have a wavelength equal to or less than 365 nanometers.

The polarized light may have energy of about 4 J to about 6 J.

The method may include forming a lower insulating layer disposed between the microcavity and the roof layer, forming an upper insulating layer on the roof layer, and forming a capping layer on the upper insulating layer.

A liquid crystal injection hole forming region may be disposed between the plurality of microcavities, and the capping layer may be formed to cover the liquid crystal injection hole forming region.

An interlayer insulating layer may be disposed between the first electrode and the second electrode, the first electrode may have a planar shape, and the second electrode may include a plurality of branch electrodes.

The branch electrodes may overlap the first electrode of the planar shape.

According to example embodiments, the photoisomer type material of a horizontal alignment layer is used to form the alignment layer in the cavity. Accordingly, a wide viewing angle liquid crystal mode using the horizontal alignment may be applied to the technique for realizing the display by filling the liquid crystal in the cavity.

DETAILED DESCRIPTION OF THE EMBODIMENTS

Figure 1:
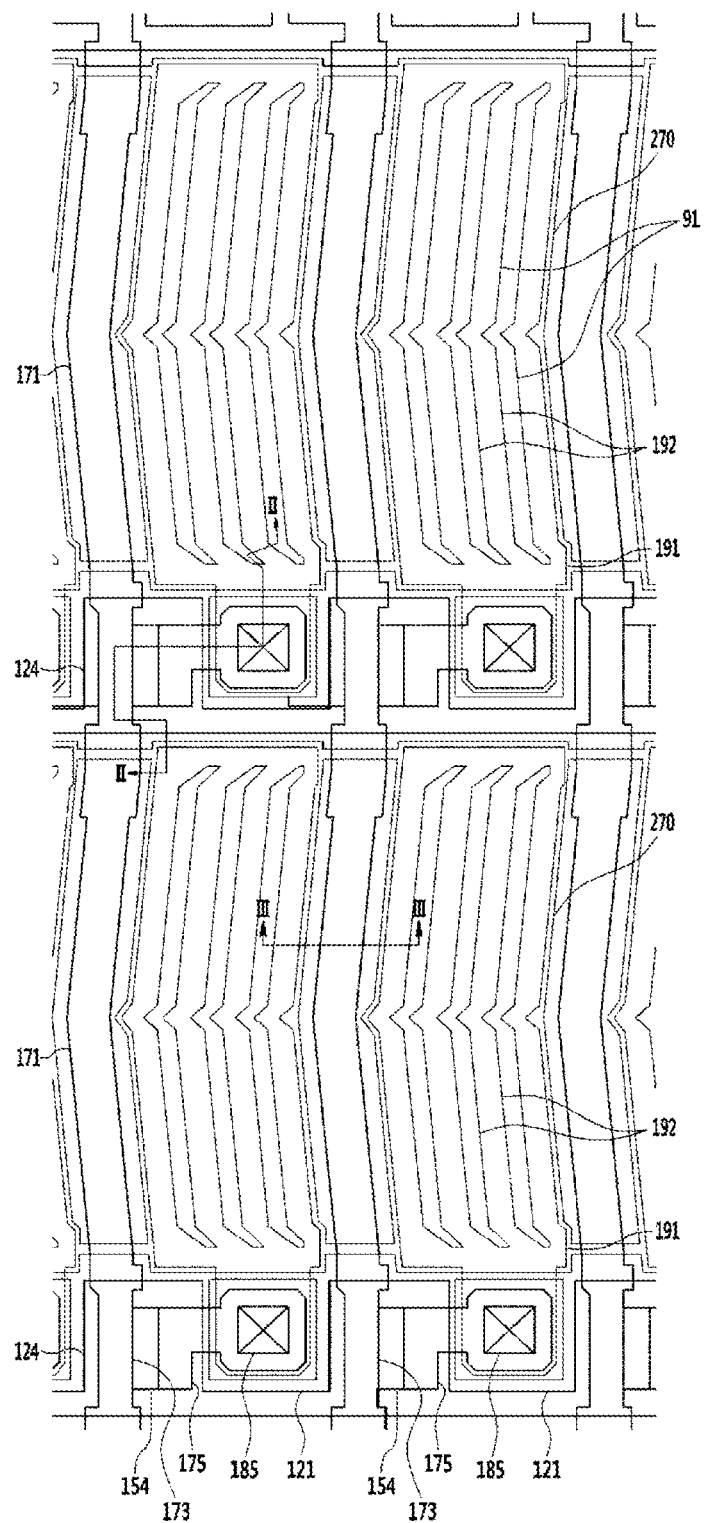
FIG. 1 is a top plan view of a liquid crystal display according to an example embodiment.

The present disclosure will be described more fully hereinafter with reference to the accompanying drawings, in which example embodiments are shown. As those skilled in the art would realize, the described embodiments may be modified in various different ways, all without departing from the spirit or scope of the present invention. On the contrary, example embodiments introduced herein are provided to make disclosed contents thorough and complete and sufficiently transfer the spirit of the present disclosure to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening layers may also be present. Like reference numerals designate like elements throughout.

Figure 2:
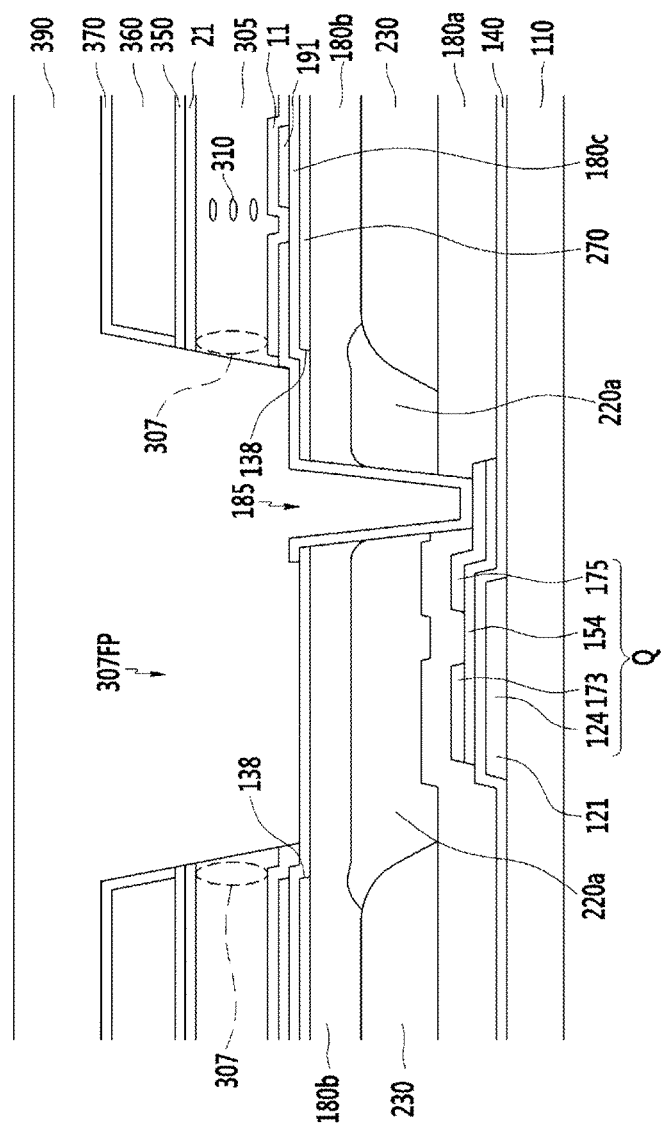
FIG. 2 is a cross-sectional view taken along a cutting line II-II of FIG. 1.
Figure 3:
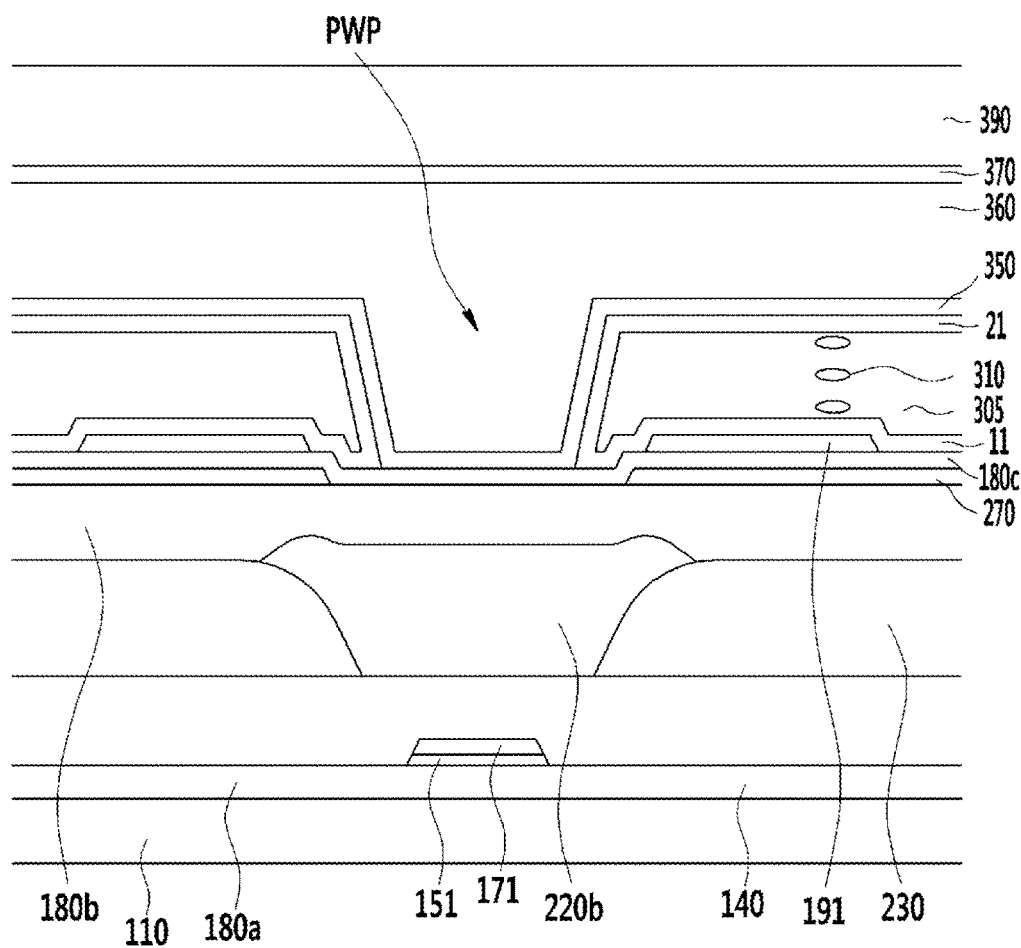
FIG. 3 is a cross-sectional view taken along a cutting line of FIG. 1.

FIG. 1 is a top plan view of a liquid crystal display according to an example embodiment. FIG. 2 is a cross-sectional view taken along a cutting line II-II of FIG. 1. FIG. 3 is a cross-sectional view taken along a cutting line of FIG. 1.

Referring to FIG. 1 to FIG. 3, a gate line 121 is formed on a substrate 110 made of transparent glass or plastic. The gate line 121 includes a gate electrode 124 and a wide end portion (not illustrated) for a connection with another layer or an external driving circuit. The gate line 121 may, for example, be formed of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may also have a multiple layer structure including at least two conductive layers having different physical properties.

A gate insulating layer 140 formed of silicon nitride (SiNx) or silicon oxide (SiOx) is formed on the gate line 121. The gate insulating layer 140 may also have a multiple layer structure including at least two insulating layers having different physical properties. A semiconductor layer 151 disposed under a data line 171 and a semiconductor layer 154 disposed under a source/drain electrode and corresponding to a channel portion of a thin film transistor Q are formed on the gate insulating layer 140. The semiconductor layer 154 may, for example, be made of amorphous silicon or polysilicon, or an oxide semiconductor.

A plurality of ohmic contacts may be formed on each of the semiconductor layers 151 and 154, and between the data line 171 and the source/drain electrode, but they are omitted in the drawings.

Data conductors 171, 173, and 175 including a source electrode 173, the data line 171 connected with the source electrode 173, and a drain electrode 175 are formed on each of the semiconductor layers 151 and 154 and the gate insulating layer 140. The data line 171 includes a wide end portion (not illustrated) for connection with another layer or an external driving circuit. The data line 171 transfers a data signal and extends mainly in a vertical direction to cross the gate line 121.

The source electrode 173 is a part of the data line 171, and is disposed on the same line as the data line 171. The drain electrode 175 is formed to extend in parallel with the source electrode 173. Accordingly, the drain electrode 175 is parallel with the part of the data line 171. The structure of the source electrode 173 and the drain electrode 175 may be changed.

The gate electrode 124, the source electrode 173, and the drain electrode 175 form one thin film transistor Q together with the semiconductor 154, and a channel of the thin film transistor is disposed in the semiconductor 154 between the source electrode 173 and the drain electrode 175.

The data line 171 and the drain electrode 175 may, for example, be made of refractory metal such as molybdenum, chromium, tantalum, and titanium or an alloy thereof, and may have a multiple layered structure including a refractory metal layer (not illustrated) and a low resistive conductive layer (not illustrated). An example of the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer.

A first protection layer 180a is formed on the data conductors 171, 173, and 175 and the exposed semiconductor layer 154. The first protection layer 180a may include the inorganic insulator such as silicon nitride (SiNx) silicon oxide (SiOx), or an organic insulator.

A color filter 230 and a light blocking member 220 are formed on the first protection layer 180a.

First, the light blocking member 220 has a lattice structure having an opening corresponding to a region displaying an image, and is formed of a material preventing light from being transmitted. The color filter 230 is formed at the opening of the light blocking member 220. The light blocking member 220 includes a horizontal light blocking member 220a formed in a direction parallel to the gate line 121 and a vertical light blocking member 220b formed in a direction parallel to the data line 171.

The color filter 230 may display one of the primary colors, such as the three primary colors including red, green, and blue. However, the colors are not limited to the three primary colors including red, green, and blue, and the color filter 230 may also display one among a cyan-based color, a magenta-based color, a yellow-based color, and a white-based color. The color filter 230 may be formed of materials displaying different colors for each adjacent pixel.

A second protection layer 180b covering the color filter 230 and the light blocking member 220 is formed on the color filter 230 and the light blocking member 220. The second protection layer 180b may include the inorganic insulating material, such as silicon nitride (SiNx) and silicon oxide (SiOx), or the organic insulating material. Contrary to the illustration in the cross-sectional view of FIG. 2, in a case where a step is generated due to a difference in a thickness between the color filter 230 and the light blocking member 220, the second protection layer 180b includes an organic insulating material, so that it is possible to decrease or remove the step.

The color filter 230, the light blocking member 220, and the protection layers 180a and 180b have a contact hole 185 exposing the drain electrode 175.

A common electrode 270 is formed on the second protection layer 180b. The common electrode 270 has a planar shape, may be formed on the entire first substrate 110 as a plate, and may have an opening 138 formed in the region corresponding to the periphery of the drain electrode 175. That is, the common electrode 270 may have the planar shape of a plate shape.

The common electrodes 270 disposed on adjacent pixels are connected to each other to receive a common voltage of a predetermined level supplied from outside of the display area.

An interlayer insulating layer 180c is formed on the common electrode 270. The interlayer insulating layer 180c may be formed of an organic insulating material or an inorganic insulating material.

A pixel electrode 191 is disposed on the interlayer insulating layer 180c. The pixel electrode 191 may be formed of a transparent conductive material such as ITO or IZO. The pixel electrode 191 includes a plurality of cutouts 91 and a plurality of branch electrodes 192 disposed between the adjacent cutouts.

The first protection layer 180a, the second protection layer 180b, and the interlayer insulating layer 180c have a contact hole 185 exposing the drain electrode 175. The pixel electrode 191 is physically and electrically connected to the drain electrode 175 through the first contact hole 185 to receive a voltage from the drain electrode 175.

The common electrode 270 is a first field generating electrode or a first electrode, and the pixel electrode 191 is a second field generating electrode or a second electrode. The pixel electrode 191 and the common electrode 270 may form a horizontal electric field, for example, upon application of voltages to the electrodes. The pixel electrode 191 and the common electrode 270 as field generating electrodes generate an electrical field such that the liquid crystal molecules 310 disposed thereon are rotated in a direction parallel to the direction of the electric field. As described above, according to the determined rotation direction of the liquid crystal molecules, the polarization of light passing through the liquid crystal layer is changed.

According to the liquid crystal display of the shown example embodiment, the common electrode 270 has the planar shape and the pixel electrode 191 has a plurality of branch electrodes, however in a liquid crystal display according to another example embodiment, the pixel electrode 191 may have a planar shape and the common electrode 270 may have a plurality of branch electrodes.

The present disclosure may be applied to all cases (i.e., any liquid crystal display panel design) in which two field generating electrodes overlap via an insulating layer on the substrate 110, the first field generating electrode under the insulating layer has a plane shape, and the second field generating electrode on the insulating layer has a plurality of branch electrodes.

A lower alignment layer 11 is formed on the pixel electrode 191 and the lower alignment layer 11 includes a photo-alignment material. The lower alignment layer 11 may be a photoisomer type among the various types of photo-alignment materials, that is, the alignment material used to form the lower alignment layer may include a photo-isomer material that changes between isomers upon irradiation with light. The photo-alignment material of the photoisomer type includes a trans type and a cis type photoisomer, i.e., the photo-alignment material has a trans-type isomer structure and a cis-type isomer structure, and the isomeric structure can be changed upon irradiation with light. In the present example embodiment, the photo-alignment material of the alignment layer includes a cis type photoisomer.

In the case of the cis type photo-alignment material, a side chain of the photo-alignment material is arranged so as to be parallel to the substrate 110, thereby realizing horizontal alignment in which the liquid crystal is also arranged parallel to the substrate 110.

The photo-alignment material according to the present example embodiment may, for example, include a cis type azo benzene as in Chemical Formula 1.

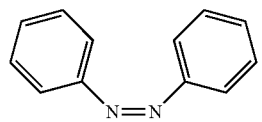

Chemical Formula 1

An upper alignment layer 21 is disposed in a position corresponding to the position over the lower alignment layer 11, and a microcavity 305 is formed between the lower alignment layer 11 and the upper alignment layer 21. The microcavity 305 is injected with a liquid crystal material including liquid crystal molecules 310, and the microcavity 305 has a liquid crystal injection hole 307.

The microcavity 305 may be formed according to a column direction of the pixel electrode 191, in other words, the vertical direction. In the present example embodiment, an alignment material forming the alignment layers 11 and 21 and the liquid crystal material including the liquid crystal molecules 310 may be injected into the microcavity 305 by using capillary force.

The microcavity 305 is divided in a vertical direction by a plurality of liquid crystal injection hole forming regions 307FP disposed at a portion overlapping the gate line 121, and there may be multiple such regions along the direction in which the gate line 121 is extended. Each of the plurality of formed microcavities 305 may correspond to a pixel area, and the pixel area may correspond to a region displaying an image.

A lower insulating layer 350 is disposed on the upper alignment layer 21. The lower insulating layer 350 may be formed of silicon nitride (SiNx) or silicon oxide (SiO2).

A roof layer 360 is disposed on the lower insulating layer 350. The roof layer 360 has a function of supporting the microcavity 305 to form the microcavity 305. The roof layer 360 may, for example, include a photoresist or other organic materials.

An upper insulating layer 370 is disposed on the roof layer 360. The upper insulating layer 370 may contact the upper surface of the roof layer 360. The upper insulating layer 370 may be formed of silicon nitride (SiNx) or silicon oxide (SiO2).

In the present example embodiment, the capping layer 390 covers the liquid crystal injection hole 307 of the microcavity 305 exposed by the liquid crystal injection hole forming region 307FP while filling the liquid crystal injection hole forming region 307FP. The capping layer 390 includes an organic material or an inorganic material.

In the present example embodiment, as illustrated in FIG. 3, a partition wall forming portion PWP is formed between the microcavities 305 which are adjacent in a horizontal direction. The partition wall forming portion PWP may be formed in a direction in which the data line 171 is extended, and may be covered by the roof layer 360. The partition wall forming portion PWP is filled with the lower insulating layer 350, the common electrode 270, the upper insulating layer 370, and the roof layer 360, and the structure forms a partition wall so that the microcavity 305 may be divided or defined. In the present example embodiment, in the partition structure, such as the partition forming portion PWP is formed between the microcavities 305 little stress is generated even though the insulating substrate 110 is bent, and a degree in which a cell gap is changed may be considerably decreased.

FIG. 4 to FIG. 14 are cross-sectional views of a manufacturing method of a liquid crystal display according to an example embodiment.

An example embodiment for manufacturing the liquid crystal display will be described referring to FIG. 4 to FIG. 14. The following example embodiment may be modified into other methods as an example embodiment of manufacturing method.

FIGS. 4, 6, 8, 10, 11, and 13 sequentially show the cross-sectional views taken along the line II-II of FIG. 1. FIG. 5, 7, 9, 12, 14 sequentially show the cross-sectional views taken along the line of FIG. 1.

Figure 4:
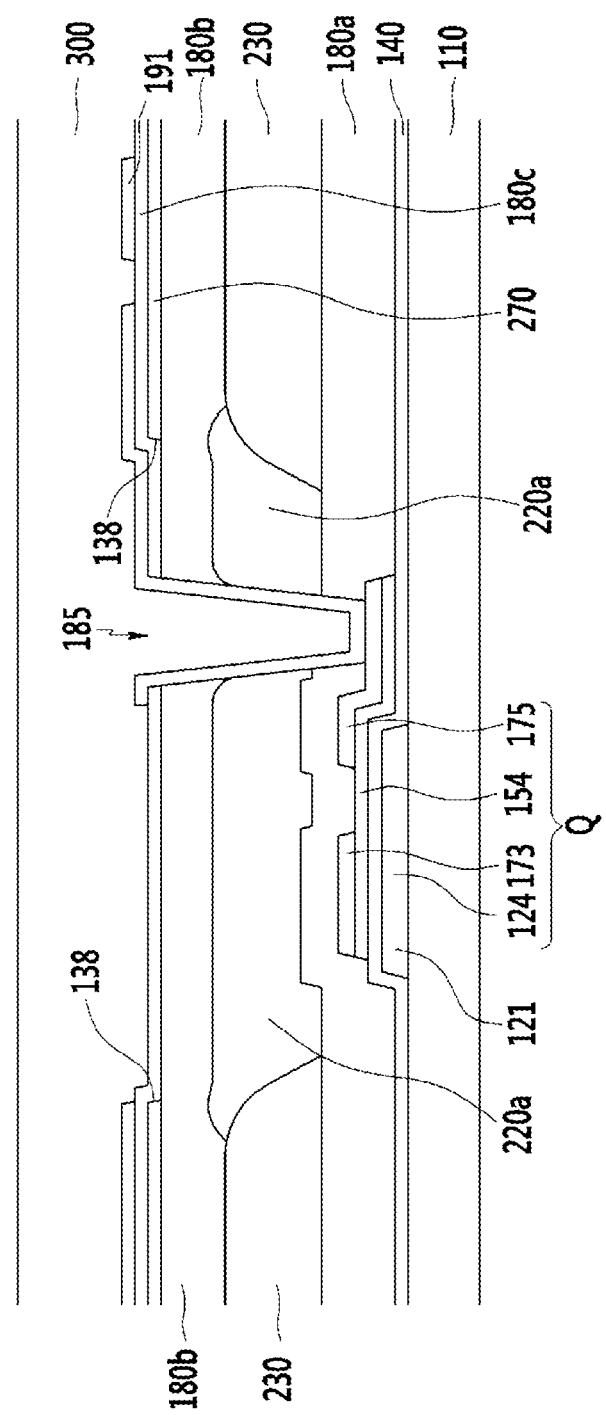
FIG. 4 to FIG. 14 are cross-sectional views showing a manufacturing method of a liquid crystal display according to an example embodiment.
Figure 5:
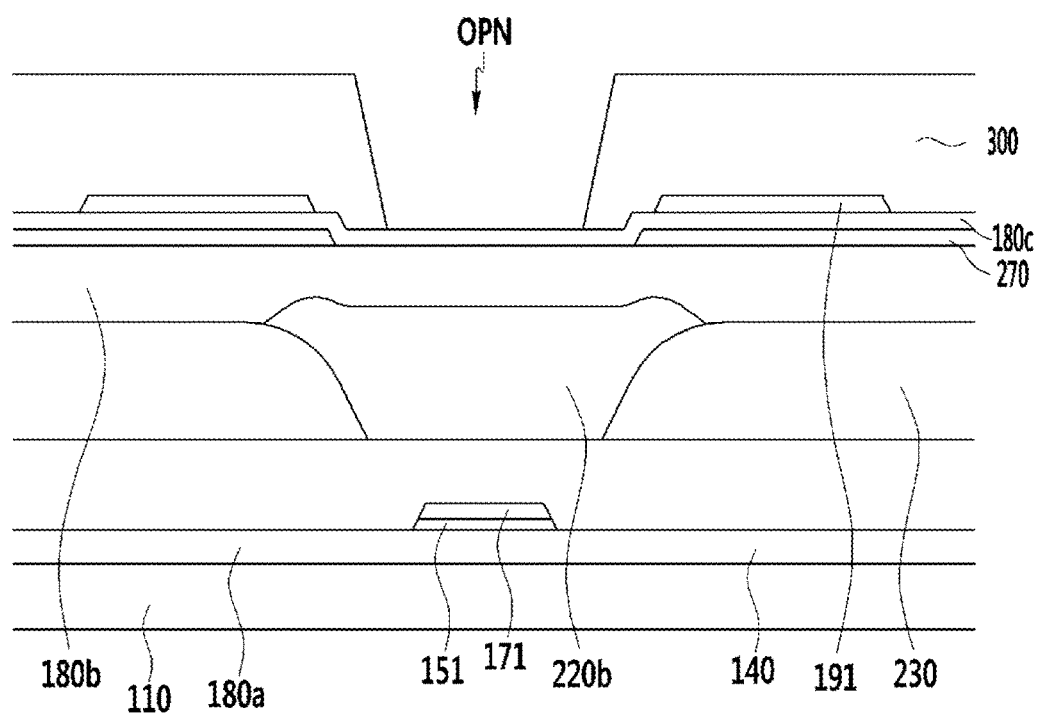

Referring to FIGS. 1, 4, and 5, in order to form a generally known switching element on a substrate 110, the gate line 121 extended in the horizontal direction is formed, and the gate insulating layer 140 is formed on the gate line 121, the semiconductor layers 151 and 154 are formed on the gate insulating layer 140, and the source electrode 173 and the drain electrode 175 are formed. In this case, the data line 171 connected with the source electrode 173 may be formed to be extended in the vertical direction while crossing the gate line 121.

A first protection layer 180a is formed on the data conductors 171, 173, and 175 including the source electrode 173, the drain electrode 175, and the data line 171, and the exposed portion of the semiconductor layer 154.

The color filter 230 is formed at a position corresponding to the pixel area on the first interlayer insulating layer 180a, and the light blocking member 220 is formed between the color filters 230.

The second protection layer 180b that covers the color filter 230 and the light blocking member 220 is formed on the color filter 230 and the light blocking member 220, and the second protection layer 180b is formed to have the contact hole 185 electrically and physically connecting the pixel electrode 191 and the drain electrode 175.

The common electrode 270 having a planar shape is formed on the second protection layer 180b. The common electrode 270 has the opening 138 disposed at the portion overlapping the gate line 121 or the data line 171, but may be formed to be connected in the adjacent pixels. The interlayer insulating layer 180c is formed on the common electrode 270, and pixel electrode 191 is formed on the interlayer insulating layer 180c. The interlayer insulating layer 180c has the contact hole 185 physically and electrically connecting the pixel electrode 191 and the drain electrode 175 along with the first protection layer 180a and the second protection layer 180b.

The pixel electrode 191 includes a plurality of cutouts 91 and a plurality of branch electrodes 192 disposed between the adjacent cutouts 91.

The sacrificial layer 300 is formed on the pixel electrode 191. As shown in FIG. 5, the sacrificial layer 300 includes an open portion OPN formed according to the direction parallel to the data line 171. In the open portion OPN, the lower insulating layer 350, the roof layer 360, and the upper insulating layer 370 are formed thereby forming the partition wall forming portion (PWP).

Figure 6:
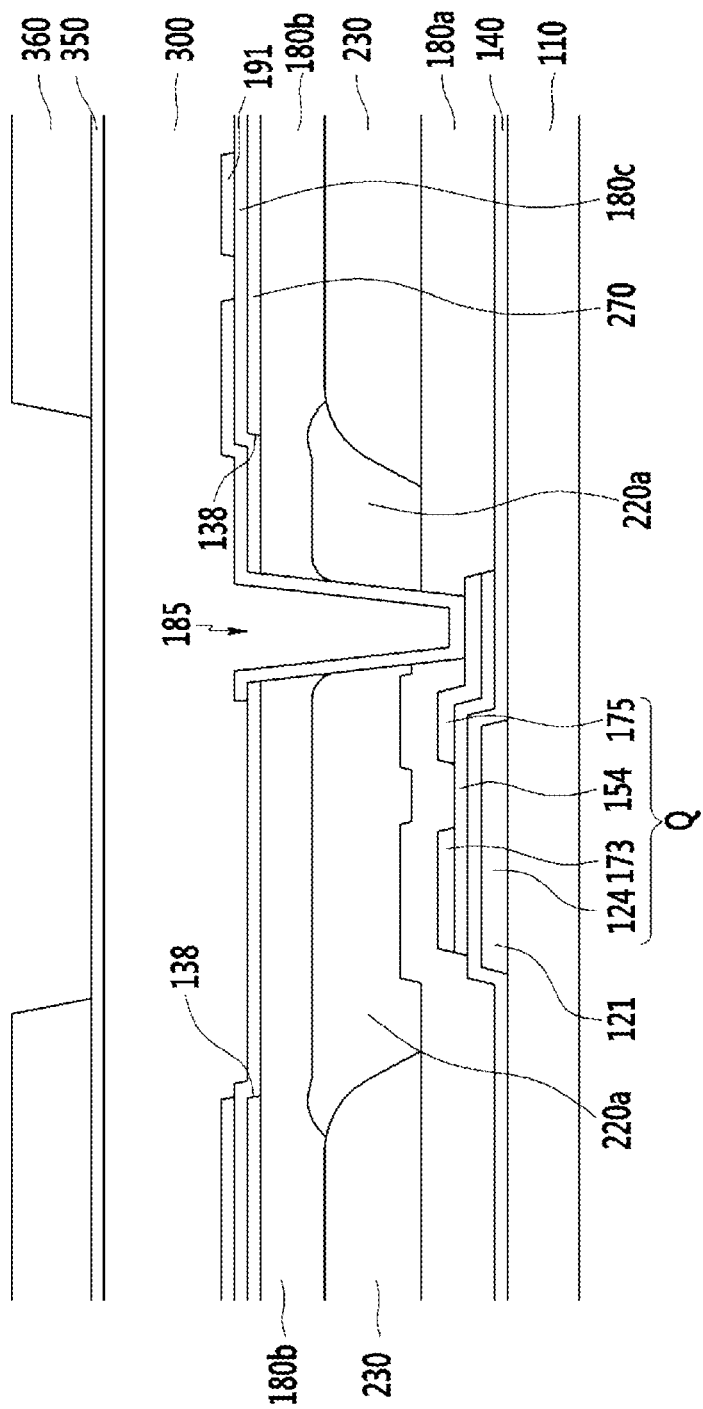
Figure 7:
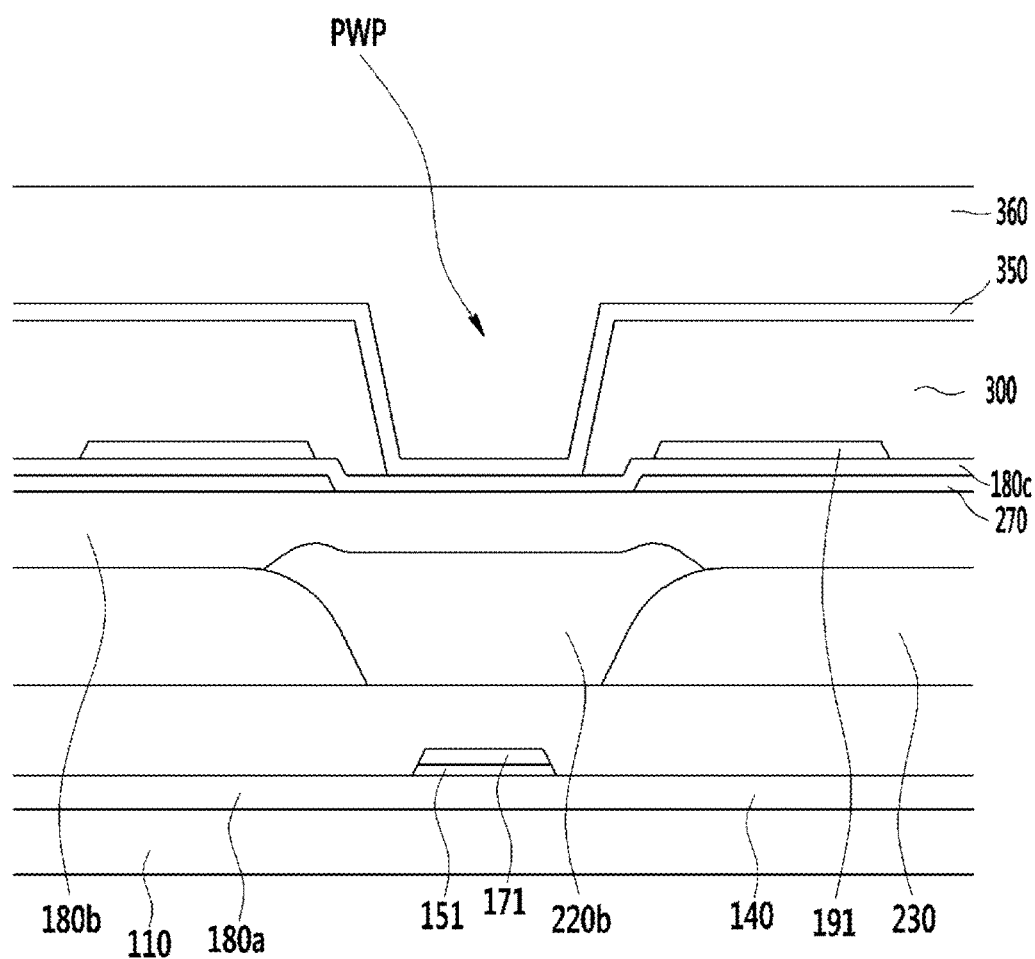

Referring to FIG. 6 and FIG. 7, the lower insulating layer 350 and the roof layer 360 are sequentially formed on the sacrificial layer 300. The roof layer 360 may be removed in the region corresponding to the blocking member 220 disposed between the pixel areas adjacent in the vertical direction by an exposure and development process. The roof layer 360 exposes the lower insulating layer 350 in the region corresponding to the light blocking member 220. At this time, the lower insulating layer 350 and the roof layer 360 fill the open portion OPN of the longitudinal light blocking member 220b, thereby forming the partition forming portion (PWP).

Figure 8:
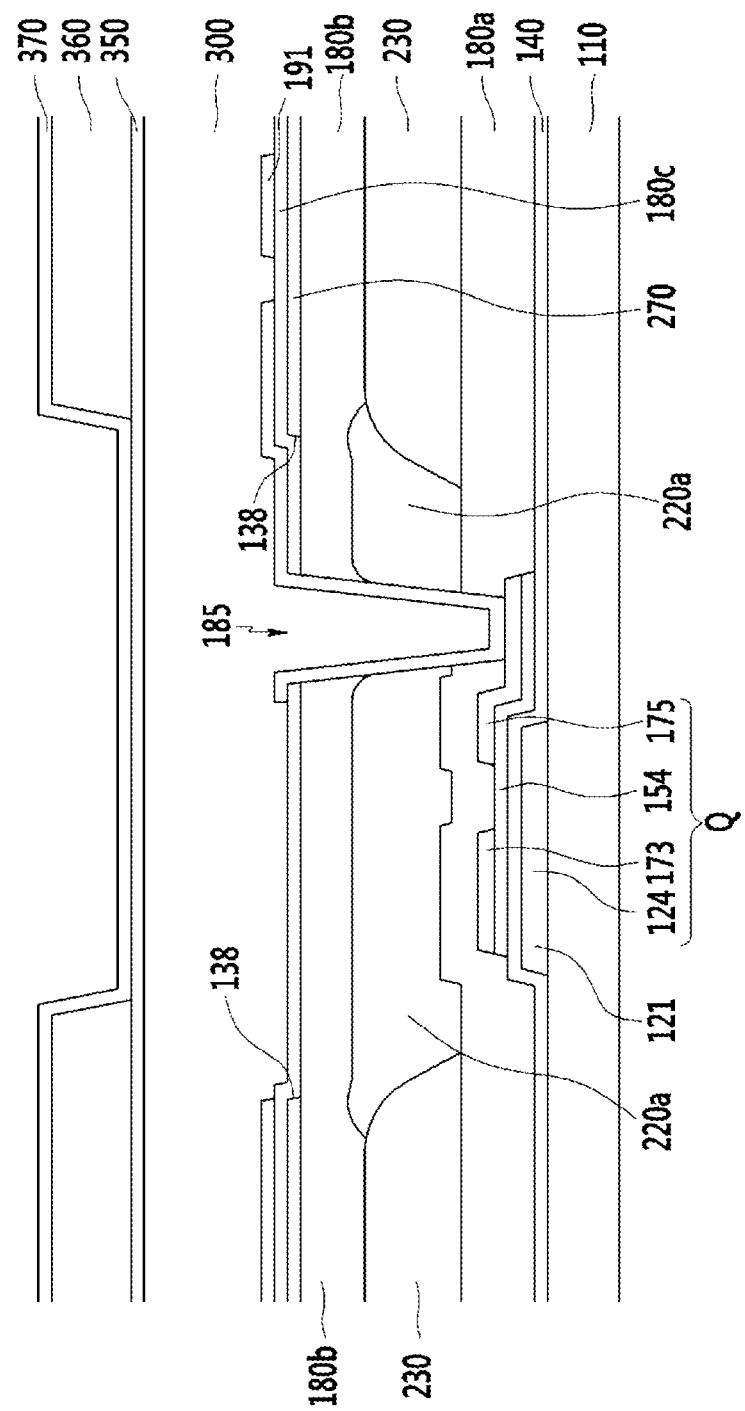
Figure 9:
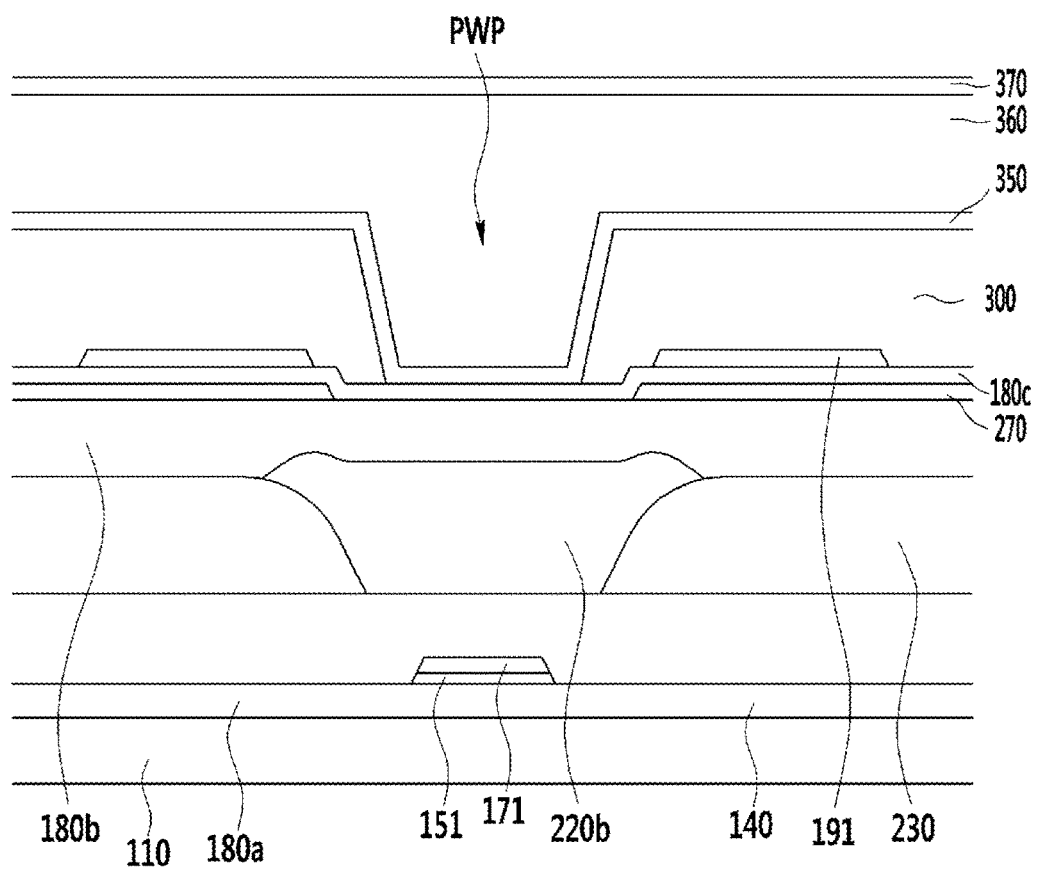

Referring to FIG. 8 and FIG. 9, the upper insulating layer 370 covering the roof layer 360 and the exposed lower insulating layer 350 is formed.

Figure 10:
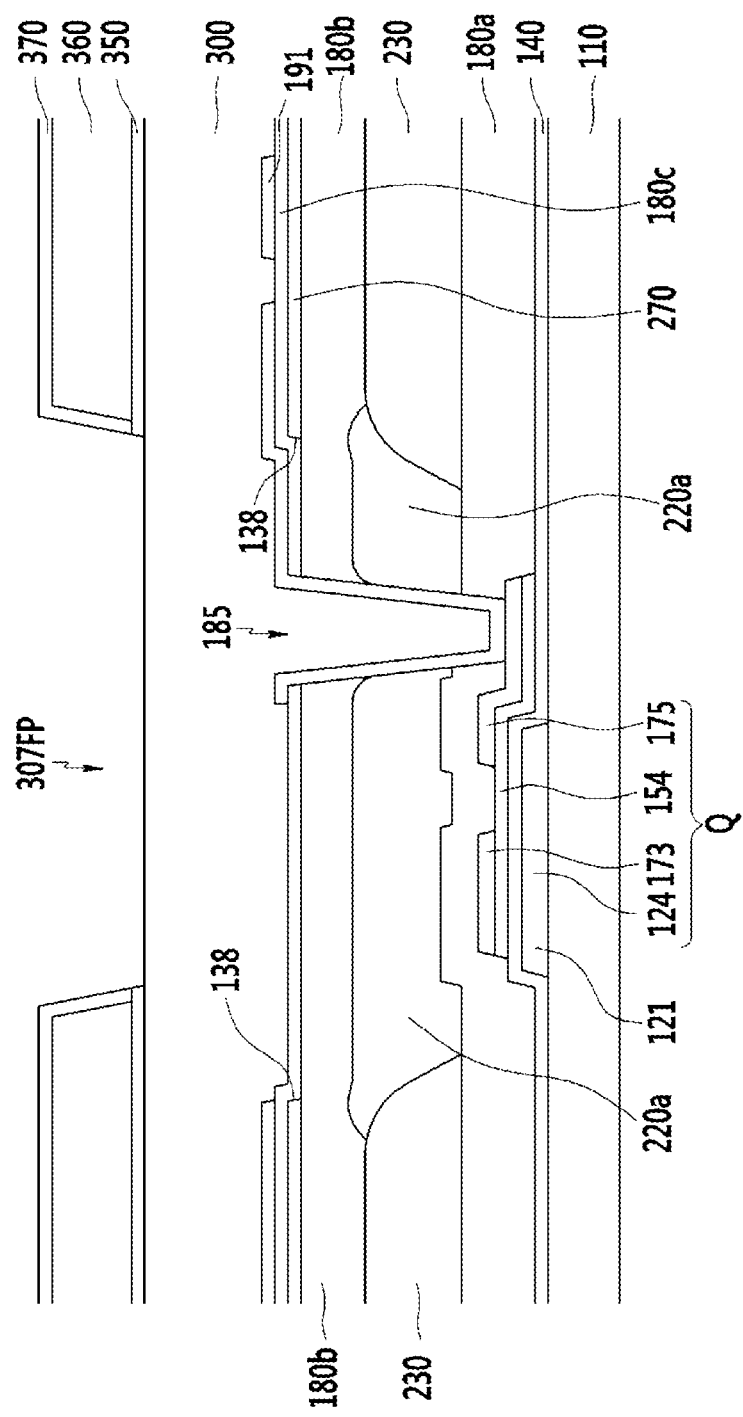

Referring to FIG. 10, the upper insulating layer 370 and the lower insulating layer 350 are dry-etched to partially remove the upper insulating layer 370 and the lower insulating layer 350, thereby forming the liquid crystal injection hole forming region 307FP. At this time, the upper insulating layer 370 may have a structure that covers the side of the roof layer 360, however it is not limited thereto, and the portion of upper insulating layer 370 covering the side of the roof layer 360 may be removed thereby exposing the side of the roof layer 360.

Figure 11:
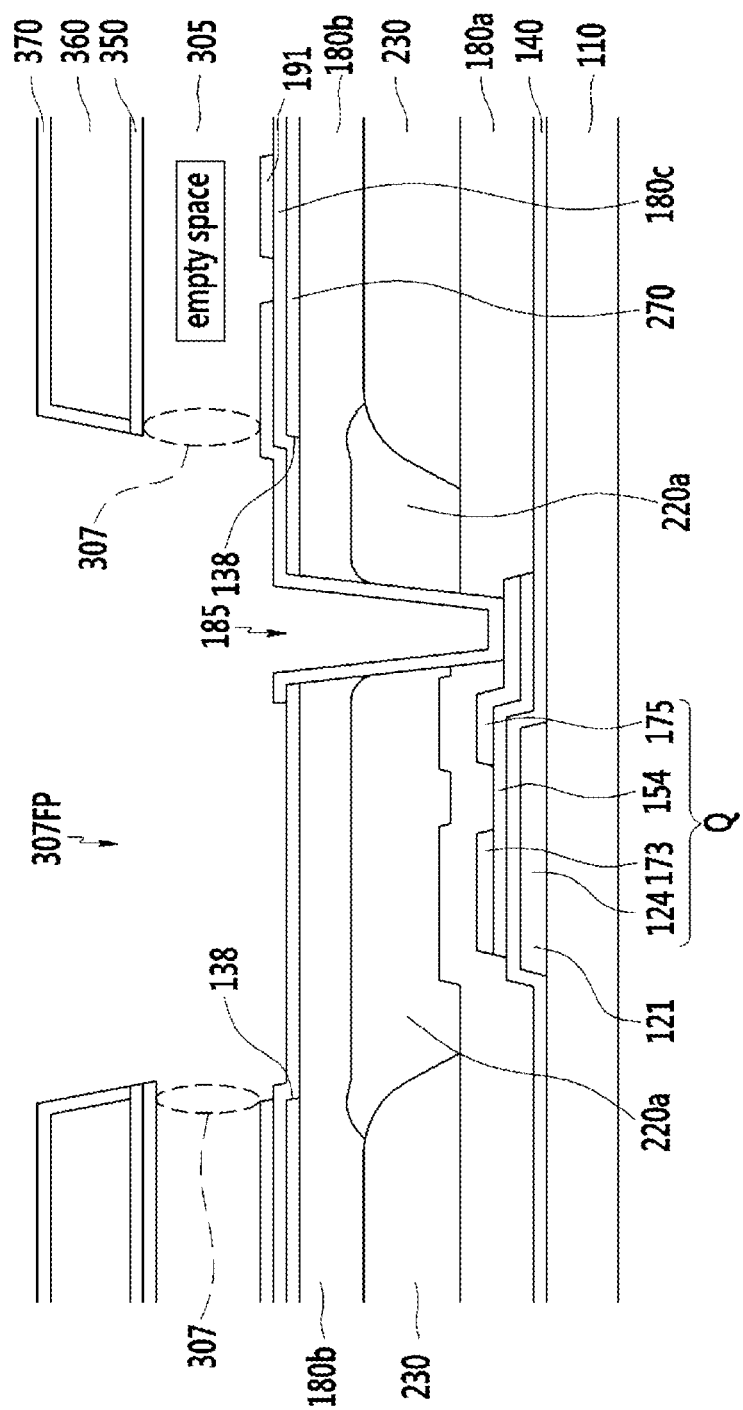
Figure 12:
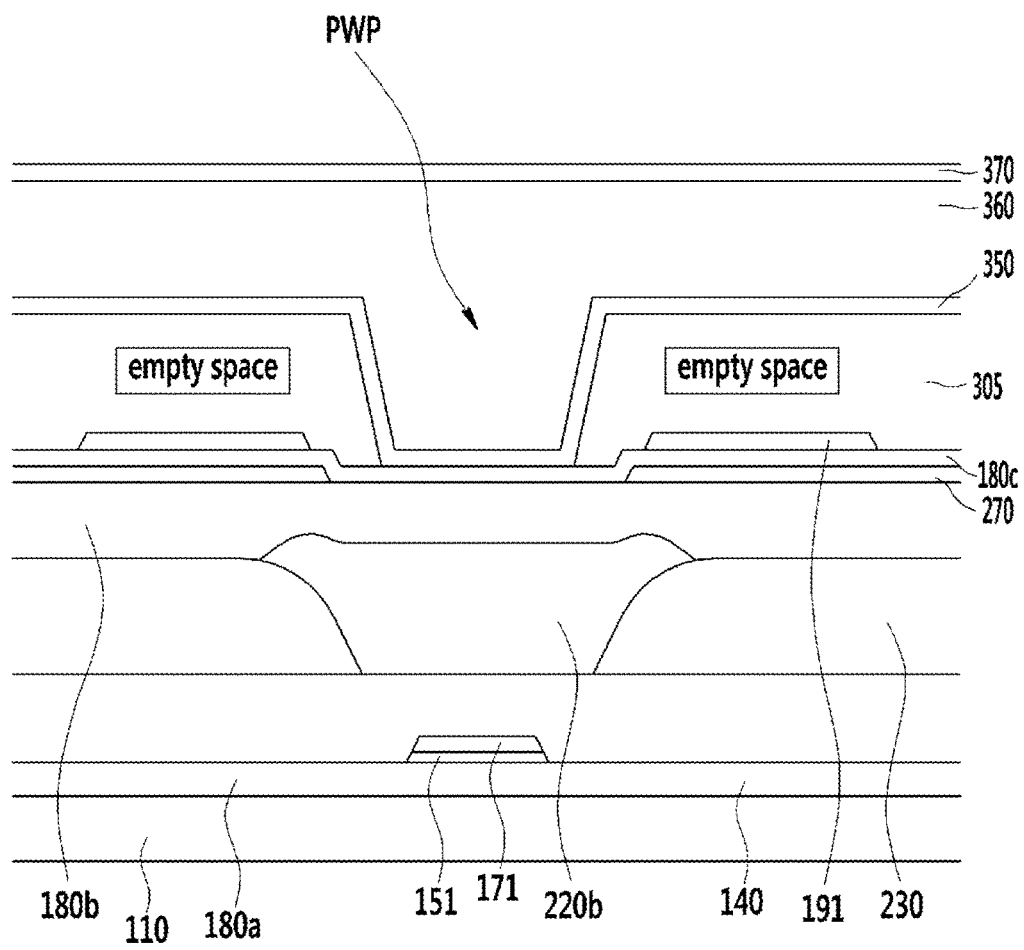

Referring to FIGS. 11 to 12, the sacrificial layer 300 is removed through the chemical liquid injection hole SE by an $O_2$ ashing process or a wet etching method. In this case, the microcavity 305 having the liquid crystal injection hole 307 is formed. The microcavity 305 is in a state of an empty space according to the removal of the sacrificial layer 300.

Figure 13:
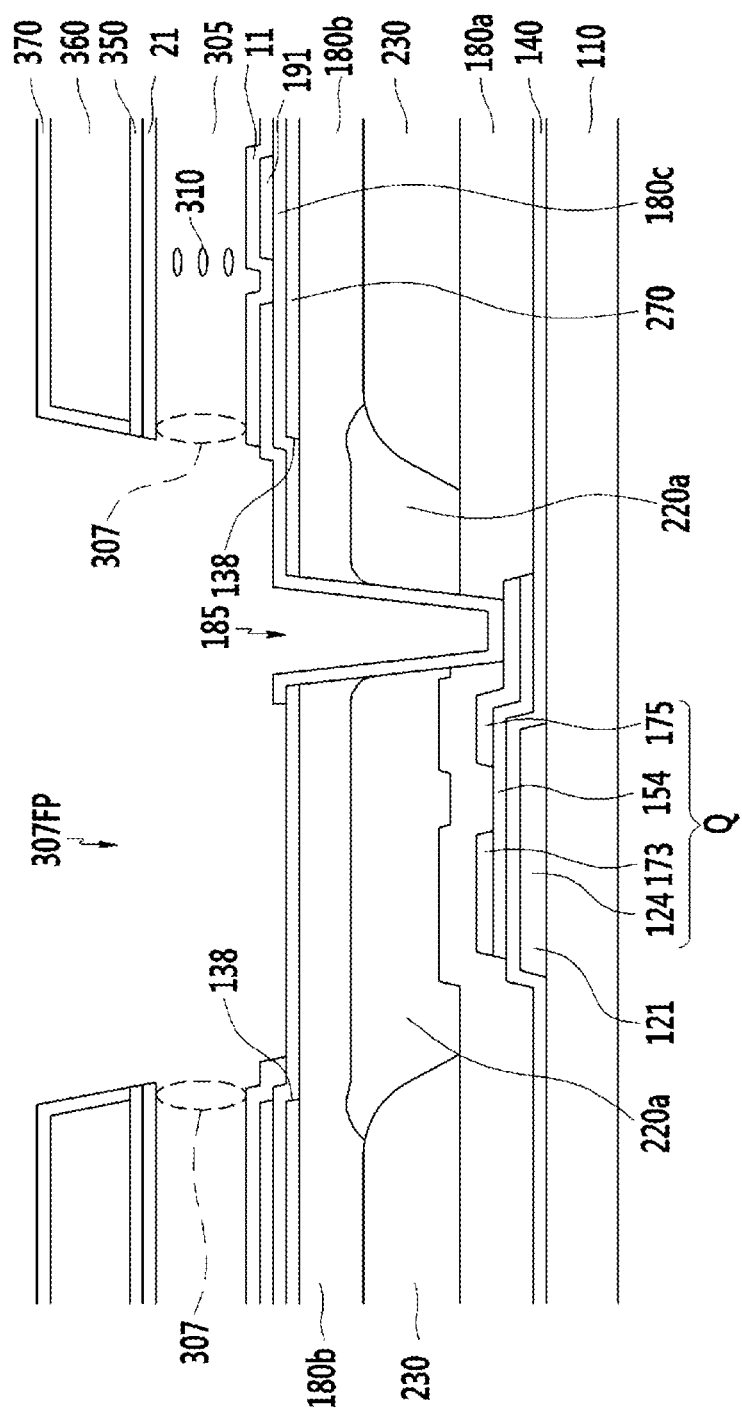
Figure 14:
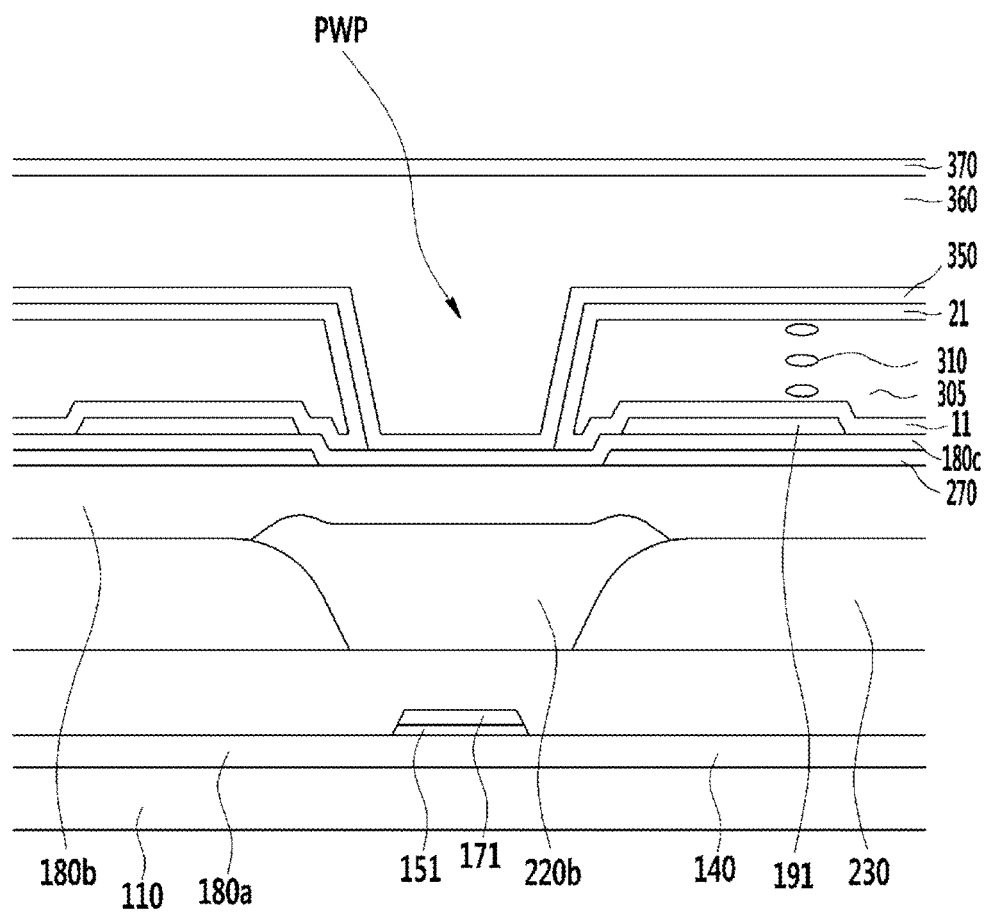

Referring to FIG. 13 and FIG. 14, the photo-alignment material is injected through the liquid crystal injection hole 307. The photo-alignment material injected into the microcavity 305 may include the cis/trans type photoisomer as described above.

Next, polarized ultraviolet rays (UV) are irradiated to the photo-alignment material injected in the microcavity 305.

In detail, the [cis type] azo benzene represented by Chemical Formula 1 may be included in the photo-alignment material injected into the microcavity.

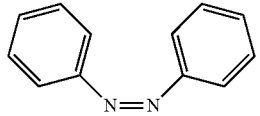

Chemical Formula 1

Accordingly, the same effect as the rubbing may be obtained. The polarized ultraviolet rays may have a 365 nanometer wavelength, however it is not limited thereto, and a wavelength at equal to or less than 365 nanometers may be used. Irradiation energy of the polarized ultraviolet rays may be in a range of about 4 J to about 6 J. Upon irradiation with UV, the photo-isomer material is in one of the isomeric states, for instance, it is in the cis-type isomeric states. In particular, if azo benzene is used as the photo-isomer material, upon irradiation with UV, cis-azo benzene is formed.

The photo-alignment material is then baked to form photo-alignment layers 11 and 21 on the inner walls of the microcavity 305.

A liquid crystal material including the liquid crystal molecules 310 is injected into the microcavity 305 through the liquid crystal injection hole 307 by using an inkjet method and the like. The liquid crystal molecule 310 may be horizontally aligned.

The capping layer 390 is formed on the upper insulating layer 370 to cover the liquid crystal injection hole 307 and the liquid crystal injection hole forming region 307FP thereby forming the liquid crystal display as shown in FIG. 2.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

<Description of Symbols>

| | | | |
|---|---|---|---|
| 300 | sacrificial layer | 305 | microcavity |
| 307 | liquid crystal injection hole | 350 | lower insulating layer |
| 360 | roof layer | 370 | upper insulating layer |
| 390 | capping layer | | |

What is claimed is:

1. A liquid crystal display comprising:
a substrate;
a thin film transistor disposed on the substrate;
a protection layer disposed on the thin film transistor;
a first electrode and a second electrode disposed on the protection layer;
an alignment layer disposed on the second electrode;
a roof layer facing the second electrode; and
a liquid crystal layer disposed in a plurality of enclosed microcavities between the second electrode and the roof layer, the microcavities each including liquid crystal molecules;
wherein the plurality of enclosed microcavities is disposed on the substrate,
wherein the liquid crystal molecules are substantially horizontally aligned,
wherein the first electrode and the second electrode are configured to form a horizontal electric field with each other,
wherein the alignment layer includes a cis type photoisomer,
wherein the plurality of enclosed microcavities comprises a first microcavity and a second microcavity adjacent to each other with respect to a data line connected to the thin film transistor, and
wherein the roof layer comprises a partition wall forming portion disposed along a direction which the data line extends, the first microcavity and the second microcavity being separated by the partition wall forming portion.

2. The liquid crystal display of claim 1, wherein the photo-alignment material includes azo benzene.

3. The liquid crystal display of claim 2, wherein the photo-alignment material is photo-reacted to UV light having a wavelength equal to or less than 365 nanometers.

4. The liquid crystal display of claim 1, further comprising:
a lower insulating layer disposed between the microcavities and the roof layer; and
an upper insulating layer disposed on the roof layer.

5. The liquid crystal display of claim 4, further comprising a capping layer disposed on the roof layer.

6. The liquid crystal display of claim 5, wherein a liquid crystal injection hole forming region is disposed between the microcavities, and the capping layer covers the liquid crystal injection hole forming region.

7. The liquid crystal display of claim 6, wherein:
an interlayer insulating layer is disposed between the first electrode and the second electrode, the first electrode has a planar shape, and the second electrode includes a plurality of branch electrodes.

8. The liquid crystal display of claim 7, wherein the branch electrodes overlap the first electrode of the planar shape.

9. A method manufacturing a liquid crystal display comprising:
forming a thin film transistor on a substrate;
forming a protection layer on the thin film transistor;
forming a first electrode and a second electrode on the protection layer;
forming a sacrificial layer on the second electrode;
forming a roof layer on the sacrificial layer;
removing the sacrificial layer to form a plurality of microcavities on the substrate, each microcavity including a liquid crystal injection hole;
injecting a photo-alignment material into the microcavities;
irradiating polarized light to the photo-alignment material;
baking the photo-alignment material; and
injecting a liquid crystal material in the microcavities of the substrate after irradiation of the photo-alignment material,
wherein the plurality of enclosed microcavities comprises a first microcavity and a second microcavity adjacent to each other with respect to a data line connected to the thin film transistor, and
wherein the roof layer comprises a partition wall forming portion disposed along a direction which the data line extends, the first microcavity and the second microcavity being separated by the partition wall forming portion.

10. The method of claim 9, wherein
the photo-alignment material includes a photoisomer type material.

11. The method of claim 10, wherein
the photo-alignment material forms a cis type photoisomer upon irradiation of the polarized light.

12. The method of claim 11, wherein
the photo-alignment material includes azo benzene.

13. The method of claim 12, wherein
the polarized light has a wavelength equal to or less than 365 nanometers.

14. The method of claim 13, wherein
the polarized light has energy of about 4 J to about 6 J.

15. The method of claim 10, comprising:
forming a lower insulating layer disposed between the microcavities and the roof layer;
forming an upper insulating layer on the roof layer; and
forming a capping layer on the upper insulating layer.

16. The method of claim 15, wherein
a liquid crystal injection hole forming region is disposed between the microcavities, and the capping layer is formed to cover the liquid crystal injection hole forming region.

17. The method of claim 16, wherein
an interlayer insulating layer is disposed between the first electrode and the second electrode, the first electrode has a planar shape, and the second electrode includes a plurality of branch electrodes.

18. The method of claim 17, wherein the branch electrodes overlap the first electrode of the planar shape.

* * * * *